United States Patent Office 2,835,607
Patented May 20, 1958

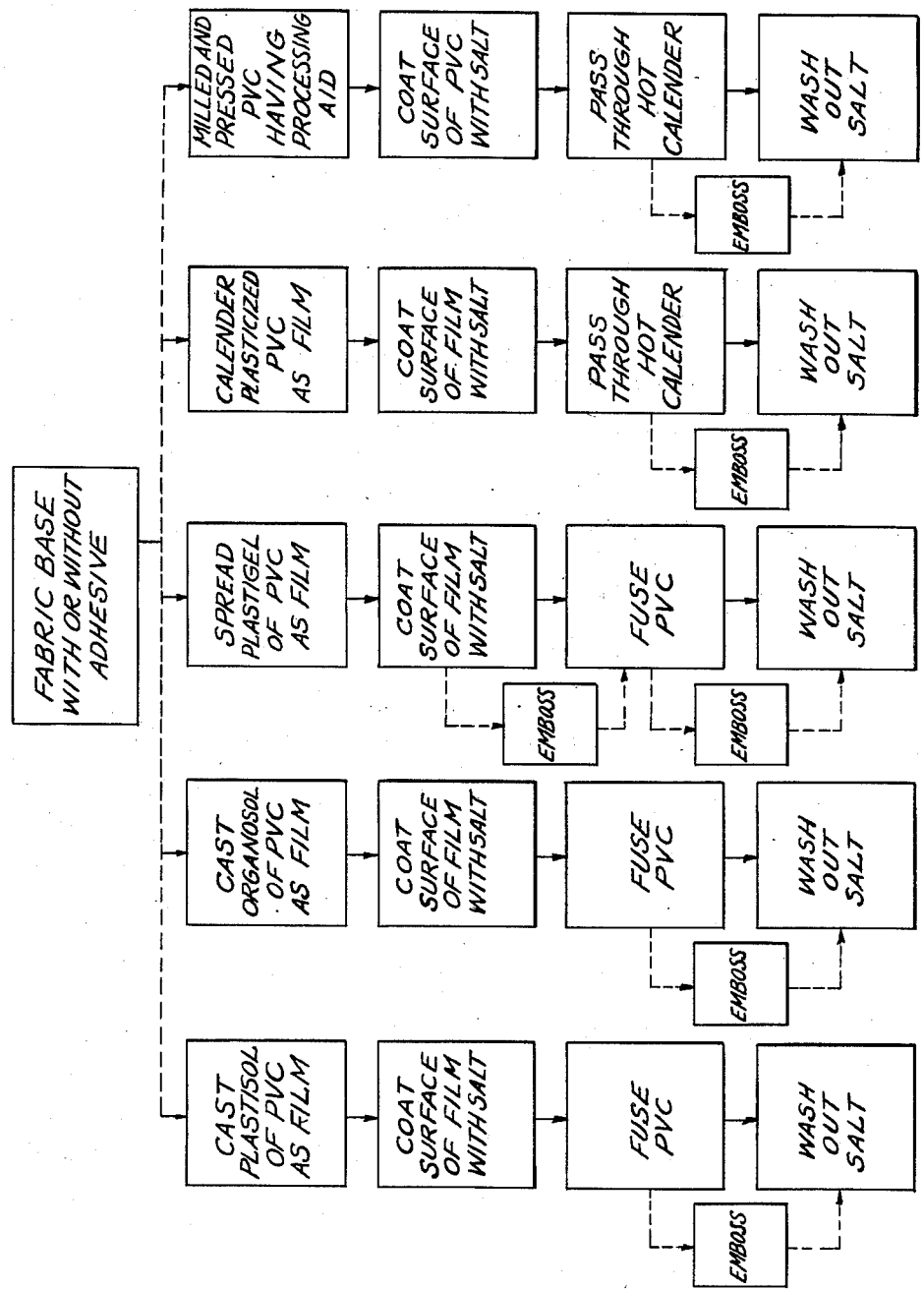

2,835,607

POLYMERIC ARTICLE HAVING SUEDE-LIKE APPEARANCE AND PROCESS OF MAKING THE ARTICLE

Clyde D. Seguer, Chagrin Falls, Ohio, assignor to The B. F. Goodrich Company, New York, N. Y., a corporation of New York Application August 4, 1954, Serial No. 447,879

16 Claims. (Cl. 117—10)

This invention relates to a thermoplastic material having the appearance and feel of suede leather and to a method of making the same. In particular, the present invention relates to thermoplastic film, sheet and the like having a surface exhibiting the appearance and feel of suede leather and being essentially non-specular and to a method for producing the same.

Suede leather has been used for a considerable period of time for clothing purposes, as an upholstery fabric and the like. However, leather, and particularly suede, are expensive materials and represent a major portion of the cost of the article in which they are incorporated. Moreover, suede leather is easily stained by oil and grease and subsequent cleaning does not restore the original luster and finish of the material even if dry cleaning is employed. Furthermore, the abrasion resistance of suede leather is low and limits its uses. On the other hand, thermoplastic materials such as vinyls are very abrasion or wear-resistant and can be cleaned easily with restoration of their original surface condition. However, such materials have a bright and highly reflective or specular surface appearance. To scarify or mechanically abrade the surface will tend to reduce somewhat the specular reflection but also will tend to damage and weaken the body of the film and produce unevenness, streaks and the like. Moreover, mechanical attrition will not give a suede-like feel to the plastic. Even a high loading of fillers still leaves the surface smooth but also reduces the strength of the film. Fillers, furthermore, do not substantially lessen the specularity of the surface of the plastic. Accordingly, it would be highly desirable to provide a material such as a synthetic polymer, which is relatively inexpensive and has high abrasion resistance with the appearance and feel of suede leather so that it can be washed with simple cleaning solutions such as soap and water to restore it to its original lustre, appearance and feel, which is resistant to retention of dirt and the like and which exhibits substantially non-specular reflection. Hence, a primary object of the present invention is to provide a plastic article of manufacture having the appearance and feel of suede leather, which can readily be cleaned to restore its original condition, resists dirt and has high abrasion resistance.

It is another object of this invention to provide a thermoplastic sheet or film having a surface exhibiting the appearance and feel of suede leather, having high abrasion resistance and which can easily be cleaned.

Still another object of this invention is to provide a strong plastic material having a substantially non-specular surface.

A further object of this invention is to provide a method for producing plastic materials having the appearance and feel of suede leather.

A still further object is to provide a method for treating a thermoplastic sheet or film to provide the same with a surface exhibiting a suede-like appearance and feel.

Yet another object is to provide a method for producing a plastic article having a substantially non-specular surface.

These and other objects and advantages of the present invention will become more apparent to those skilled in the art from the following detailed description, examples and drawing which is a flowsheet illustrating several methods of producing thermoplastic materials which have the appearance and feel of suede leather and which are substantially non-specular.

It has now been discovered according to the present invention that, by substantially fixably embedding a powdered, non-hygroscopic material in the surface or outer surface layers of a polymeric composition comprising a polymer of a monomeric material in which each constituent contains a single olefinic double bond and in which the predominant monomer is a haloethylene having from 1 to 2 halogen atoms selected from the group consisting of chlorine, bromine and fluorine atoms on only one carbon atom, said powdered, non-hygroscopic material being soluble in a non-solvent for said composition, and then removing said powdered, non-hygroscopic material by dissolving it in a solvent which is a non-solvent for said composition, there is obtained a polymeric composition having the appearance and feel of suede leather and high abrasion resistance. The surface of the composition also exhibits diffuse reflection and is easily cleaned with soap and water to restore it to its original appearance and feel. The process of the present invention is applicable to fused, plasticized polymeric haloethylene compositions and to plastisols, organosols and plastigels formed of such compositions as well as to rigid or essentially unplasticized haloethylene compositions. The method disclosed herein thus affords an easy way of obtaining polymeric haloethylene compositions, flexible or rigid, having a surface exhibiting a suede-like appearance and feel.

As shown in the flowsheet of the drawing several methods may be employed to produce the suede-like product of the present invention. While the flowsheet discloses the use of polyvinyl chloride and salt, it is to be understood that such is for illustrative purposes as other haloethylene polymers and other powdered non-hygroscopic materials soluble in a non-solvent for the polymeric film may be used.

For example, when using a polyvinyl chloride plastisol composition, the composition is deposited, cast or spread as a thin layer to form a film or sheet on a metal base or other material from which it may later be stripped. The salt is then dusted over the surface of the plastisol to completely cover it and the plastisol fused. After the fusing step, the film cools, or can be cooled, and is stripped from the base. The salt coating, which had become substantially embedded in the surface of the film or in its outer surface layers, is removed by washing or leaching in water. Alternatively, the fused film while still hot but at a temperature below its softening point can be immediately treated with wash water. It will be understood that the salt particles are substantially fixably secured in the surface or outer surface layers of the film after fusing and cannot be removed mechanically except by abrading the surface, by picking them out or tearing the surface of the film or the body of the film to irreparably damage the same but can be removed by dissolving them in a solvent. The washed material may then be allowed to air dry or may be dried in an oven at low temperatures. Embossing using a heated roll should follow fusing and should precede washing where it is desired to form a novel design in the surface of the film. Embossing should not follow washing as such step would tend to smooth out or destroy the suede-like surface of the film when the salt is removed unless a film having non-suede-like areas is desired to provide novel designs.

Organosols may be used to prepare a suede-like film or sheet in the same manner as shown above with respect to plastisols allowing sufficient time during the heating step to permit evaporation of diluent vapors.

When plastigels are used, the plastigel is spread on the base to form a layer or film, the surface of the layer coated with a layer of powdered salt, heated to fuse, washed and dried. When embossing is desired, it is best performed prior to fusing the plastigel to take advantage of the fact that the plastigel will hold its shape at room temperature after embossing. However, embossing may be performed after the fusing step.

Moreover, fused plasticized polyvinyl layers, film or sheet, may also be coated with salt and washed to obtain a suede-like material. Granular or powdered polyvinyl chloride and plasticizer are mixed in a Banbury or other mixer and calendered between hot rolls or pressed at from about 230 to 310° F. or higher to form a fused or set film or sheet. The film is then covered with salt, passed through rolls at about 300° F., or heated by means of infra-red ray lamps to soften the surface of the film and passed through rolls, to embed the salt particles in the surface of the film. The coated surface may then be embossed and is washed. Instead of charging the Banbury with dry granular or powdered polymer and plasticizer, it can be charged with plastisol, plastigel or organosol and gelled, fused and then calendered, although preferably these materials are used only in casting and spread coating.

Rigid polyvinyl chloride compounds containing minor amounts of a processing aid and, desirably, a material to improve impact resistance may also be treated according to the method of the present invention. The polymer is milled on a hot mixing mill to fuse it, sheeted out to the desired thickness, or pressed in molds, coated with powdered salt, hot pressed to embed the salt particles in the surface of the polymer, embossed if desired, and washed to remove the salt.

In the methods described supra the polymer also may be cast, pressed on, etc., a base material such as fabric to provide reinforcement. Both sides of the base may be coated with the polymer if desired. Prior to applying the polymer to the fabric, the fabric may have been treated with an adhesive such as a polyvinyl chloride, or a blend of polyvinyl chloride and a rubbery copolymer of butadiene-1,3 and acrylonitrile, latex or cement or the like and usually dried to improve the adhesion between the polymer coating and the fabric base. Moreover, the wash water may contain a detergent to facilitate removal of the salt or the salt may contain a minor amount of a detergent if such is deemed necessary. Furthermore, while the foregoing methods have described the development of a suede-like surface on only one side of the polymer film, it is apparent that by careful control of heat and pressure a suede-like finish can be obtained on the other or untreated side of the film. For example, after proceeding through any one of the foregoing methods to obtain a suede-like surface on one side of the film, the film can be turned over and the untreated side dusted with salt, heated at a high temperature for a short period of time and quickly pressed to force the salt into the outer surface layer or layers of the film. The heat treatment should only soften the surface or the outer surface layers of the polymer film and not the main body of the film to avoid loss of the suede finish already obtained on the first named side. After pressing and cooling below the softening point of the polymer, the film can then be washed. Alternatively, two films having suede-like surfaces can be cemented together on their untreated sides and if desired a supporting fabric can be interposed between them to provide a laminated structure. Where a film has been cast or calendered on one side of a fabric support and treated as disclosed herein, another film can be cast or calendered onto the untreated side of the fabric and then processed as disclosed herein, care being taken to avoid heating times and pressures which might destroy the original suede surface. Still another method is to deposit a salt layer loosely bound with a water-soluble binder, such as gum tragacanth, for the substrate on a base and then cast a vinyl film on the substrate, sprinkle salt on the exposed surface, fuse, and wash. After the film or sheet of the polymer has been treated as disclosed herein to obtain a suede-like surface, it can be subsequently printed with novel designs if desired.

The polymeric material used in practice of the present invention includes all of the haloethylene polymers composed predominantly of a polymerized haloethylene having from one to two halogen atoms selected from the group consisting of chlorine, bromine and fluorine atoms attached to only one of the carbon atoms, such as homopolymers of vinyl chloride, vinyl bromide, vinyl fluoride, vinylidene chloride, vinylidene bromide and vinylidene fluoride and interpolymers or copolymers of two or more of these monomers. Copolymers or interpolymers made from monomeric mixtures containing at least one haloethylene monomer together with a lesser amount of one or more copolymerizable monoolefinic monomers can also be employed. Monoolefinic materials which can be co- or interpolymerized with the haloethylene monomers include vinyl esters such as vinyl acetate, vinyl propionate, vinyl butyrate, vinyl chloroacetate, vinyl chloropropionate, vinyl benzoate, vinyl chlorobenzoate, and others; acrylic and alpha-alkyl acrylic acids, their alkyl esters, their amides and their nitriles such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-dimethyl acrylamide, methacrylamide, N-methyl methacrylamide, N,N-dimethyl methacrylamide acrylonitrile, chloroacrylonitrile, methacrylonitrile, ethacrylonitrile, and the like; vinyl aromatic compounds such as styrene, dichlorostyrene, vinyl naphthalene, and others; alkyl esters of maleic and fumaric acids such as dimethyl maleate, diethyl maleate, and others; vinyl alkyl ethers and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone, etc.; and in addition other monoolefinic materials such as vinyl pyridine, N-vinyl carbazole, N-vinyl pyrrolidone, ethyl methylene malonate, isobutylene, ethylene, trichloroethylene, and various other readily polymerizable compounds containing a single olefinic double bond, especially those containing the $CH_2=C<$ group. When utilizing interpolymers or copolymers the proportions of the various monomers in the monomeric mixtures polymerized to give the interpolymer may be varied considerably as long as the haloethylene monomer constitutes at least 50% by weight of the total. For example, there may be used copolymers of from 50 to 99%, or more preferably from 70 to 95%, by weight of the haloethylene monomer together with from 1 to 50%, more preferably from 5 to 30%, by weight of a vinyl ester, or an acrylic or methacrylic ester or any of the other monoolefinic materials mentioned above, or any two, three, four, etc., of these. Tripolymers of from 50 to 90% by weight of vinyl chloride, from 5 to 45% by weight of vinylidene chloride, and from 5 to 45% by weight of a vinyl ester such as vinyl acetate or vinyl benzoate, or an acrylic or methacrylic ester are examples of vinyl halide polymers which may be used. Of the various polymers disclosed herein those composed of a vinyl halide, especially vinyl chloride, and of a predominant amount of vinyl halide and a minor amount of a vinylidene halide, especially copolymers of a predominant amount of vinyl chloride and a minor amount of vinylidene chloride and blends of these polymers and copolymers, are preferred. Blends or mixtures of the foregoing homopolymers, copolymers and interpolymers can also be used. Where the polymer is to be calendered, it may be in the form of granules, pellets or powder prior to mixing with plasticizer in the Banbury and the like. However, when making plastisols, plastigels or organosols, the polymer should be in the form of powder and may be porous.

Suitable plasticizers for the haloethylene containing polymers are octyl diphenyl phosphate, tricresyl phosphate, tributoxy ethyl phosphate, dioctyl adipate, dioctyl azelate, dioctyl phthalate, dibutyl phthalate, hexachloro-diphenyl oxide, toluene sulfonamide-aldehyde resin, a composition such as a mixture of a water-insoluble thermoplastic cellulose ether, di(4-tertiary butyl phenyl) monophenyl phosphate and di(4-tertiary butyl phenyl) mono (5-tertiary butyl-2-xenyl) phosphate, etc. The plasticizers are used in amounts necessary to give the required flexibility to the fused polymer and may vary widely in amounts depending on type of plasticizer and ultimate use of polymer. The amounts of plasticizer employed are also dependent on the method of handling the polymer, that is, whether a casting or spreading process is contemplated requiring a plastisol and the like. From about 30 to 200 parts by weight of the plasticizer can be used for every 100 parts by weight of the polymer although for best results it is preferable that the polymeric composition comprise from about 50 to 100 parts by weight of plasticizer for every 100 parts by weight of the polymeric material present. When making a calender mix, the plasticizer and polymer are mixed in a Banbury or other suitable mixer and the temperature may go above the gel point and as high as about 340° F. to provide a soft, workable material. On the other hand when making plastisols and liquid-like masses, the temperature during mixing should be below the gel point and preferably not above room temperature, about 25° C., to provide a liquid or pourable composition having a viscosity of from about 200 to 40,000 centipoises and up to as high as 130,000 centipoises.

Organosols are prepared by adding a minor amount, 10 to 50%, or more by weight based on the weight of the plastisol or total solids of a volatile organic diluent to the plastisol composition or by replacing part of the plasticizer with diluent. Examples of useful solvents for forming organosols are mineral spirits, toluene and the like. Organosols are more fluid than plastisols and are desirable to use where increased fluidity is indicated or where some penetration of the support material is required.

Plastigels are obtained by adding a thickening agent such as a metallic soap to the plastisol compositions. Examples of such soaps are sodium stearate, calcium stearate, aluminum distearate, lithium distearate, magnesium stearate, and lithium hydroxy stearate. Generally, from 5 to 10 parts by weight of the soap are used for every 100 parts by weight of the plastisol composition. The plastigels are putty-like masses at room temperature; they are plastisols with a significant yield point and can be a very fluid mixture, e. g., a non-drip dipping compound or a non-fabric penetrating coating compound. They retain their form when embossed and after embossing can be fused at about 300 to 400° F. They are useful where it is not desired to emboss the fused material at high temperatures and pressures.

When making rigid materials of haloethylene containing polymers, the polymer in the form of granules, pellets or powder is placed on a mill or in a Banbury with about 5% of its weight of a processing aid such as a copolymer of about 75% by weight of styrene and the balance acrylonitrile, mixed and sheeted out to the desired thickness. Alternatively, the mixture can be heated to the softening temperature and pressed in a mold to the desired shape and size. If increased impact resistance is desired in the finished product, about 5% by weight based on the weight of the polymer of a material such as a terpolymer of about 67% butadiene-1,3, 17% styrene and 16% acrylonitrile can be added to the mixture while it is on the mill.

The polymeric haloethylene compositions described herein may also contain minor amounts of suitable stabilizers such as basic lead carbonate, lead oxide, alkaline earth silicates, lead silicate, lead stearate, titanium dioxide, the lead phenolate and the like. Such stabilizers are preferably used in an amount of from 0.1 to 10 parts by weight per 100 parts by weight of haloethylene containing polymer. Other suitable compounding ingredients for haloethylene polymers may be incorporated in the polymer composition such as extenders, fillers, dyes, color pigments, metal particles, fungicides, germicides, minor amounts of rubbery polymers such as a copolymer of about 55 to 70% butadiene-1,3 and the balance acrylonitrile, and the like.

The material used to provide the suede-like finish on the surface of the polymer should be non-hygroscopic and soluble in a non-solvent for the polymer, plasticizer and other compounding ingredients. Moreover, it should be insoluble or only sparingly soluble in the polymer, plasticizer and other compounding ingredients, or incompatible with the same, in order that it can readily be removed from the same. Furthermore, the suede forming material should be a solid and not decompose, react, melt or soften in the polymeric composition at fusing or embossing temperatures. Materials, thus, found useful in the practice of the present invention are alkali metal halide salts such as sodium chloride, potassium chloride and sodium bromide and mixtures thereof which are insoluble in the polymer, plasticizer and compounding ingredients but are readily soluble in a solvent such as water which is a non-solvent or essentially a non-solvent for the materials of the polymer composition. Other materials exhibiting the aforementioned properties can, likewise, be used in the practice of the present invention. The non-hygroscopic material, moreover, should be in a finely-divided or powdered condition to provide a suede-like finish on the surface of the polymer. Preferably about 90% of the particles of the suede forming material should be of a size to pass about a 100 mesh U. S. S. screen with the major amount of the particles in the range of about −100 to −325 mesh U. S. S. screen size. While somewhat larger particles can be employed, they should not be in chunk or granulated form since the surface of the polymer will appear spongy or full of holes rather than suede-like and will trap dirt and be less wear-resistant. On the other hand, the particles should not be very substantially finer than shown above as they tend to produce a surface which appears almost smooth and light reflecting and is non-suede-like in appearance and feel. The amount of suede-forming material applied to the surface of the polymer should be sufficient to completely cover the same. Preferably, a monolayer of such material is employed for purposes of economy and uniformity. The suede forming material is applied to the surface of the polymer by any one of several methods, for example, by blowing, dusting, shaking, sprinkling, etc., or by spreading when a fused film or sheet is to be treated. It, of course, is apparent that by masking the surface of the polymer composition so that only a portion of the surface is covered with the suede-forming material, interesting designs and the like can be formed on the surface of the polymer composition.

The solvent used in removing the suede-forming material can be any solvent for such material which is, as described supra, essentially a non-solvent for the polymer, plasticizer and other compounding ingredients of the polymer composition. Water is an excellent solvent for the salts described supra but other solvents may be used for these and other suede-forming materials. It will be understood that a minor amount of the soap used in forming plastigels may come out of the plastic when treating the plastic with water to remove the salt. However, a considerable amount of soap remains in the plastic so that the water may be considered a non-solvent in such cases. Detergents such as Sotex CW (compounds of long-chain fatty acid esters of multiple ether amine linkages), Santomerse S (salts of substituted aromatic sulfonic acids), Aerosol 18 (N-octadecyl disodium sulfosuccinamate) and the like in an amount of about .01 to .50% by weight may be added to a solvent such as water to increase the wetting power of the water and the efficiency of the removal of the salt from the polymer. The time of washing, leaching or treating the suede-forming material to remove the salt from the surface of the polymer will vary with the method of washing, degree of agitation, amount of coating and/or polymer present, etc., and will vary from a few minutes to several hours. After washing the polymer to remove the suede-forming material, it may be dried in air at room temperature, or in an oven at a temperature of from about 100 to 175° F. or higher.

When it is desired to provide a support for the suede-like polymer film of the present invention, the support can be attached to the film before or after the suede-like surface is developed on the polymer. For example, a plastisol, organosol, etc., can be spread on the support and the plastisol treated as described above or the plastisol can be cast on a metal belt, and after the foregoing treatment to produce a suede-like surface has been accomplished, it can be applied to a support by passing through a rubber laminating roll. The support is usually heated to cause the non-suede surface of the fused film to adhere securely to the support. Adhesives such as polyvinyl latices, mixtures of polyvinyl chloride and butadiene-1,3-acrylonitrile copolymers dispersed in aqueous media or dissolved in organic solvents, can also be used to secure the film to the support. After applying the adhesive to the support, it can be dried if desired before the non-suede side of the polymer film is applied. The supporting material can be solid, such as films of other synthetic materials, wood, paper and the like or a woven material such as an open mesh, stretchable cotton fabric. Other fabrics such as twills and drills of cotton, wool, synthetic fibers or mixtures thereof, sized or unsized, can likewise be employed.

The suede-like appearance and feel of polymers treated according to the present invention are comparable to the appearance and feel of the best grades of suede leather. The abrasion resistance of such surface is better than that of suede leather. Moreover, the surface can be readily cleaned of grease and oil with water and soap and/or detergents with no adverse effects whereas suede leather is adversely affected by even the smallest amount of grease or oil which cannot be removed readily with restoration of its original appearance. The surface exhibits diffuse reflection or is non-specular in contrast to a polymer which has not been surface treated. When viewed under a low power microscope, the treated surface of the film exhibits hills, valleys and a plurality of craters of various sizes. When viewed under a low power microscope with the light at a different direction, the surface appears eroded or matted. It is believed that the results obtained when practicing the present invention are due to the fact that only a portion of the coating or of each particle or particles of suede producing material is substantially fixably embedded in the surface layer or layers of the polymer film when fused. On dissolving out the suede producing material, cavities which are undercut are produced in the surface of the polymer film, and the sides of the cavities will be on a number of different planes or be of spherical form conforming to the original shape of the material used.

As light enters the opening of the cavity it will be reflected in directions substantially other than the opening of the cavity but rather will be reflected to some other plane in the cavity. The end result will be that only a very small portion, if any, of the light will be reflected out of the cavity. Furthermore, the light which does reflect from the sheet will be in many directions rather than one direction because of the random surfaces in the cavity. Hence, the non-specular surface is essentially like that of the suede leather. Moreover, as the walls of the cavities are thin and since the cavities are only open at one point, the walls have some flexibility and tend to act as fibers so that the surface of the film feels as if it had a nap or a residual layer of shorn material as is exhibited by suede leather. Films or molded parts of haloethylene polymers can be prepared of any desired thickness by the method of the present invention depending on the amount or number of plastisol coatings cast, the spacing between the calender rolls, the depth of the mold, etc. However, thin sheets or films are preferable. Films made according to the invention disclosed herein have been made in thicknesses of from 5 to 50 mils and served every purpose for which intended.

The following examples will serve to illustrate the invention with more particularity to those skilled in the art.

*Example I*

5 parts by weight of titanium dioxide, 2 parts by weight of copper phthalocyanine green pigment, 0.1 part by weight of Supercarbovar (very small particle size fluffy channel carbon black) as a gelling agent and pigment, and 3 parts by weight of Dyphos (dibasic lead phosphite) were mixed with 75 parts by weight of dioctyl phthalate. There were stirred into the resulting mixture at a temperature of about 25° C. 20 parts by weight of Surfex (surface coated precipitated calcium carbonate) as an extender, 55 parts by weight of powdered polyvinyl chloride, and 45 parts by weight of a powdered copolymer of about 95% by weight of vinyl chloride and the balance vinylidene chloride to form a plastisol. The plastisol was then cast onto a metal plate to form a film about 10 mils thick. Powdered salt, NaCl, was then sprinkled through an 80 mesh (U. S. S. screen size) screen to form a thin, complete coating on the surface of the plastisol. The screen analysis of the salt was as follows:

| U. S. S. Screen Size | Percent Retained |
|---|---|
| 100 | 13.7 |
| 140 | 18.5 |
| 170 | 8.5 |
| 230 | 10.5 |
| 325 | 16.3 |
| Balance Through 325 | 32.5 |
| Total | 100.0 |

After the surface of the plastisol had been coated with the layer of salt, the plastisol was fused at about 350° F., cooled, stripped from the metal base, and agitated in water for 20 minutes to remove the salt layer. The resulting film was squeezed in wringer rolls to remove most of the water and was given a final drying in an oven at 122° F. overnight. The resulting product was flexible and abrasion resistant, exhibited diffuse reflection, and was essentially vapor and water impermeable. Grease applied to the film could easily be removed with water and soap leaving the surface of the film in its original condition. The salt treated surface had the appearance and feel of suede leather.

*Example II*

A composition was prepared similar to that shown in Example I above except that it was fused and calendered into a thin sheet. Sodium chloride particles of about the same mesh size as shown in Example I above were sprinkled over the surface of the fused polymer sheet and then hot pressed to force a portion of the salt coating into the outer surface layers of the polymer. The hot pressed coated polymer was then washed in water to remove the salt. The resulting film had a suede-like appearance and feel. It also had a surface exhibiting diffuse reflection.

*Example III*

Powdered salt, sodium chloride, was spread on a metal base to form an even, continuous layer. The mesh size of the salt was the same as shown in Example I above. A sheet of a plasticized polyvinyl chloride composition similar to that shown in Example I except that it had been fused and calendered was then hot pressed against the salt layer to force the salt into the outer surface layers of the film. After cooling, the salt-coated film was washed to remove the salt to provide a polyvinyl chloride composition having a surface exhibiting diffuse reflection and which was suede-like in appearance and feel.

*Example IV*

The method of this example was the same as Example I except that the plastisol was cast as a 20 mil film onto an open weave, stretchable nylon fabric (2.5 oz. per sq. yd.) as a support. The resulting product was the same as that of Example I except that its tensile strength and stiffness had been increased due to the presence of the nylon fabric backing.

*Example V*

100 parts by weight of pellets of polyvinyl chloride were mixed with 5 parts by weight of a copolymer comprising about 75% by weight of styrene and the balance acrylonitrile and with 5 parts by weight of a terpolymer comprising about 67% by weight butadiene-1,3, 17% styrene and 16% acrylonitrile on a hot roll mill and sheeted out to form a film about 20 mils thick. The surface of the film was coated with a thin layer of powdered sodium chloride of the same mesh size as shown in Example I, above, and hot pressed (for 15 seconds at 5,000 p. s. i.) between spacers in a press to embed the salt particles in the softened outer surface layers of the polymer. On release of the press and cooling, the coated film was washed in water to remove the salt. The properties of the resulting film were the same as those exhibited by the film of Example I except that it was very rigid due to the absence of conventional plasticizers.

In summary, the present invention teaches that novel products comprising a polymeric haloethylene having the appearance and feel of suede leather, high abrasion resistance and exhibiting diffuse reflection can be prepared by embedding in the surface of such polymers a material which is soluble in a non-solvent for the polymer and removing said material with said solvent. The novel process or method of the present invention is applicable to plasticized layers and rigid compositions of haloethylene polymers as well as to plastisols, plastigels and organosols of haloethylene compositions. It can be used with many support materials. Films, sheets and molded goods can be treated according to the method of the present invention. The method can also provide for embossing and masking to provide a large number of decorative suede-like plastic products. The products of the present invention will have utility in the manufacture of clothing, as upholstery material for furniture, automotive door panels, women's and men's suede shoes, women's purses, luggage, watch bands, billiard table cloths, and many applications where a haloethylene plastic having a surface exhibiting diffuse reflection is desired.

What is claimed is:

1. An article of manufacture comprising a fused composition comprising a polymer of a monomeric material in which each constituent contains a single carbon to carbon double bond and in which the predominant monomer is a haloethylene selected from the group consisting of vinyl chloride, vinyl bromide, vinyl fluoride, vinylidene chloride, vinylidene bromide, and vinylidene fluoride and mixtures thereof, the surface of said composition having a plurality of cavities to provide a suede-like appearance and feel and exhibiting diffuse reflection and being substantially vapor- and water-impermeable.

2. An article of manufacture comprising a flexible fused polymer of a monomeric material in which each constituent contains a single carbon to carbon double bond and in which the predominant monomer is a haloethylene selected from the group consisting of vinyl chloride, vinyl bromide, vinyl fluoride, vinylidene chloride, vinylidene bromide and vinylidene fluoride and mixtures thereof, the surface of said polymer exhibiting diffuse reflection and having a plurality of cavities to provide a suede-like appearance and feel and the body of said polymer being essentially free of voids and being essentially vapor- and water-impermeable.

3. An article of manufacture according to claim 2 in which said haloethylene monomer comprises a vinyl halide.

4. An article of manufacture according to claim 3 in which said vinyl halide is vinyl chloride.

5. An article of manufacture according to claim 2 in which said polymer comprises a copolymer of a predominant amount of a vinyl halide and a minor amount of a vinylidene halide.

6. An article of manufacture according to claim 5 in which said vinyl halide is vinyl chloride and said vinylidene halide is vinylidene chloride.

7. An article of manufacture according to claim 2 in which said polymer comprises a blend of a polyvinyl halide and a copolymer of a predominating amount of a vinyl halide and a minor amount of a vinylidene halide.

8. An article of manufacture according to claim 7 in which said vinyl halide in said polymer and copolymer is vinyl chloride and said vinylidene halide in said copolymer is vinylidene chloride.

9. The method which comprises substantially fixedly embedding in the outer surface layers of a processable, nonaqueous polymeric composition without substantially penetrating the main body of said composition, the polymer of said composition being a polymer of a monomeric material in which each constituent contains a single carbon to carbon double bond and in which the predominant monomer is a haloethylene selected from the group consisting of vinyl chloride, vinyl bromide, vinyl fluoride, vinylidene chloride, vinylidene bromide, vinylidene fluoride and mixtures thereof, a relatively thin coating of a powdered, non-hygroscopic, water soluble material, about 90% of the particles of said non-hygroscopic material passing through about a 65 mesh U. S. S. screen and a major amount of said particles being in the range of about −100 to −325 mesh U. S. S. screen, and treating said composition with water to remove said coating of said non-hygroscopic material from said layers to provide a polymeric composition having a plurality of minute cavities in its outer surface layers, exhibiting diffuse reflection and a suede-like appearance and feel, and being essentially vapor- and water-impermeable.

10. The method which comprises depositing on the surface of a homogeneous appearing, nonaqueous plastisol composition without substantially penetrating the main body of said composition, said composition comprising a polymer of a monomeric material in which each constituent contains a single carbon to carbon double bond and in which the predominant monomer is a haloethylene selected from the group consisting of vinyl chloride, vinyl bromide, vinyl fluoride, vinylidene chloride, vinylidene bromide, vinylidene fluoride and mixtures thereof and a plasticizer in an amount at least sufficient to form a plastisol, a relatively thin layer of a powdered, non-hygroscopic, water soluble material, about 90% of the particles of said non-hygroscopic material passing through about a 65 mesh U. S. S. screen and a major amount of said particles being in the range of about −100 to −325 mesh U. S. S. screen, heating said plastisol composition to fuse the same, and washing said fused plastisol composition with water to remove said layer of said non-hygroscopic material from the surface of said fused plastisol composition to provide a plasticized polymeric composition having a plurality of minute surface cavities, exhibiting diffuse reflection and a suede-like appearance and feel, and being essentially vapor- and water-impermeable.

11. The method which comprises mixing together below gelling temperature to form a homogeneous appearing nonaqueous plastisol composition a polymer of a monomeric material in which each constituent contains a single carbon to carbon double bond and in which the predominant monomer is a haloethylene selected from the group consisting of vinyl chloride, vinyl bromide, vinyl fluoride, vinylidene chloride, vinylidene bromide, vinylidene fluoride and mixtures thereof and a plasticizer for said polymer in an amount at least sufficient to form a plastisol, spreading said plastisol composition as a thin coating on at least one side of a fabric web, dusting the surface of said plastisol composition with a powdered, non-hygroscopic, water soluble salt in an amount sufficient to form an essentially complete coating at least a monolayer thick on the surface of said plastisol composition without substantially penetrating the main body of said plastisol composition, about 90% of the particles of said non-hygroscopic material passing through about a 65 mesh U. S. S. screen and a major amount of said particles being in the range of about −100 to −325 mesh U. S. S. screen, heating said plastisol composition to fuse the same, and washing said fused plastisol composition with water to remove said coating of said non-hygroscopic material from the surface of said fused plastisol composition to provide a flexible polymeric composition secured to said fabric web and having a plurality of minute cavities in its outer surface layers, exhibiting diffuse reflection and a suede-like appearance and feel, and being essentially vapor- and water-impermeable.

12. The method which comprises depositing on the surface of a homogeneous appearing nonaqueous plastigel composition without substantially penetrating the main body of said composition, said composition comprising a polymer of a monomeric material in which each constituent contains a single carbon to carbon double bond and in which the predominant monomer is a haloethylene selected from the group consisting of vinyl chloride, vinyl bromide, vinyl fluoride, vinylidene chloride, vinylidene bromide, vinylidene fluoride and mixtures thereof, a plasticizer in an amount at least sufficient to form a plastisol with said polymer and a minor amount of a thickening agent to form a plastigel of said plastisol, a relatively thin coating of a powdered, non-hygroscopic, water soluble material, about 90% of the particles of said non-hygroscopic material passing through about a 65 mesh U. S. S. screen and a major amount of said particles being in the range of about −100 to −325 mesh U. S. S. screen, heating said plastigel composition in contact with said coating to fuse the same, and washing said fused plastigel composition containing said coating with water to remove said coating of said non-hygroscopic material from the surface of said fused plastigel composition to provide a plasticized polymeric composition having a plurality of minute surface cavities, exhibiting diffuse reflection and a suede-like appearance and feel, and being essentially vapor- and water-impermeable.

13. The method which comprises coating the surface of a homogeneous appearing nonaqueous gelled composition without substantially penetrating the main body of said composition, said composition comprising a polymer of a monomeric material in which each constituent contains a single carbon to carbon double bond and in which the predominant monomer is a haloethylene selected from the group consisting of vinyl chloride, vinyl bromide, vinyl fluoride, vinylidene chloride, vinylidene bromide, vinylidene fluoride and mixtures thereof and a plasticizer in an amount at least sufficient to plasticize said polymer, with a relatively thin layer of a powdered, non-hygroscopic, water soluble material, about 90% of the particles of said non-hygroscopic material passing through about a 65 mesh U. S. S. screen and a major amount of said particles being in the range of about −100 to −325 mesh U. S. S. screen, fusing said composition, and treating said composition with water to remove said layer of said non-hygroscopic material from the surface of said composition to provide a fused plasticized polymeric composition having a plurality of minute cavities in its surface, exhibiting diffuse reflection and a suede-like appearance and feel, and being essentially vapor- and water-impermeable.

14. The method which comprises dusting the surface of a nonaqueous homogeneous appearing organosol composition without substantially penetrating the main body of said composition, said composition comprising a polymer of a monomeric material in which each constituent contains a single carbon to carbon double bond and in which the predominant monomer is a haloethylene selected from the group consisting of vinyl chloride, vinyl bromide, vinyl fluoride, vinylidene chloride, vinylidene bromide, vinylidene fluoride and mixtures thereof, a plasticizer in an amount at least sufficient to form a plastisol with said polymer and from 10 to 50% by weight based on the weight of the plastisol of a volatile organic diluent to form an organosol of said plastisol, with a finely-divided, non-hygroscopic, water soluble material to provide a relatively thin layer on said composition, about 90% of the particles of said non-hygroscopic material passing through about a 5 mesh U. S. S. screen and a major amount of said particles being in the range of about −100 to −325 mesh U. S. S. screen, removing said diluent, fusing said composition and washing said fused composition with water to remove said layer of said non-hygroscopic material from the surface of said fused composition to provide a plasticized polymeric composition having a plurality of minute surface cavities, exhibiting diffuse reflection and a suede-like appearance and feel, and being essentially vapor- and water-impermeable.

15. The method according to claim 11 in which said polymer comprises polyvinyl chloride.

16. The method according to claim 11 in which said polymer comprises polyvinyl chloride and said non-hygroscopic material comprises sodium chloride.

References Cited in the file of this patent

UNITED STATES PATENTS

| 2,006,687 | Riddock | July 2, 1935 |
| 2,537,631 | Greenup et al. | Jan. 9, 1951 |
| 2,663,663 | Weltman et al. | Dec. 22, 1953 |

FOREIGN PATENTS

| 418,240 | Great Britain | Oct. 22, 1934 |
| 244,901 | Switzerland | July 16, 1947 |

UNITED STATES PATENT OFFICE
CERTIFICATE OF CORRECTION

Patent No. 2,835,607                               May 20, 1958

Clyde D. Segner

It is hereby certified that error appears in the printed specification of the above numbered patent requiring correction and that the said Letters Patent should read as corrected below.

Column 10, line 35, for "fixedly" read — fixably —; column 12, line 40, for "5 mesh U. S. S. screen" read — 65 U. S. S. screen —.

Signed and sealed this 16th day of September 1958.

(SEAL)
Attest:

KARL H. AXLINE                                        ROBERT C. WATSON

Attesting Officer                                      Commissioner of Patents